United States Patent
Cheng et al.

(10) Patent No.: US 8,404,202 B2
(45) Date of Patent: Mar. 26, 2013

(54) UREA-RESISTANT CATALYTIC UNITS AND METHODS OF USING THE SAME

(75) Inventors: Yisun Cheng, Ann Arbor, MI (US); Yinyan Huang, Northville, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/480,672

(22) Filed: May 25, 2012

(65) Prior Publication Data

US 2012/0230894 A1 Sep. 13, 2012

Related U.S. Application Data (62) Division of application No. 12/489,703, filed on Jun. 23, 2009, now Pat. No. 8,207,084.

(51) Int. Cl.
*B01D 53/94* (2006.01)
*B01J 33/00* (2006.01)
*B01J 37/00* (2006.01)
*F01N 3/10* (2006.01)

(52) U.S. Cl. ..... 423/213.2; 60/299; 60/301; 502/527.12
(58) Field of Classification Search ............. 60/299, 60/301; 423/213.2; 502/527.12
See application file for complete search history.

(56) References Cited

U.S. PATENT DOCUMENTS

| | | | |
|---|---|---|---|
| 3,468,815 A | 9/1969 | Cole et al. |
| 3,853,787 A | 12/1974 | Potts et al. |
| 5,738,024 A | 4/1998 | Winegar |
| 6,054,408 A | 4/2000 | Hums et al. |
| 6,093,378 A | 7/2000 | Deeba et al. |
| 6,328,779 B1 | 12/2001 | He et al. |
| 6,770,590 B2 | 8/2004 | Watanabe |
| 6,790,808 B2 | 9/2004 | Tanada et al. |
| 6,855,303 B1 | 2/2005 | Mowery-Evans et al. |
| 6,930,073 B2 | 8/2005 | Dou |
| 6,949,683 B2 | 9/2005 | Wieland et al. |
| 7,056,859 B2 | 6/2006 | Hachisuka |
| 7,138,358 B2 | 11/2006 | Huang et al. |
| 7,150,866 B2 | 12/2006 | Wieland et al. |
| 7,220,702 B2 | 5/2007 | Hara et al. |
| 7,226,884 B2 | 6/2007 | Yang et al. |
| 7,229,597 B2 | 6/2007 | Patchett et al. |
| 7,235,511 B2 | 6/2007 | Kawamoto et al. |
| 7,332,135 B2 | 2/2008 | Gandhi et al. |
| 7,374,728 B2 | 5/2008 | Nakanishi et al. |
| 7,446,070 B2 | 11/2008 | Hori et al. |
| 7,446,076 B2 | 11/2008 | Miyoshi et al. |
| 7,481,983 B2 | 1/2009 | Patchett et al. |
| 7,510,994 B2 | 3/2009 | Ikeda et al. |
| 7,517,826 B2 | 4/2009 | Fujdala et al. |
| 7,527,776 B2 | 5/2009 | Golden et al. |

(Continued)

FOREIGN PATENT DOCUMENTS

WO 2005064130 7/2005

*Primary Examiner* — Timothy Vanoy
(74) *Attorney, Agent, or Firm* — Damian Porcari; Brooks Kushman P.C.

(57) ABSTRACT

According to at least one aspect of the present invention, a urea-resistant catalytic unit is provided. In at least one embodiment, the catalytic unit includes a catalyst having a catalyst surface, and a urea-resistant coating in contact with at least a portion of the catalyst surface, wherein the urea-resistant coating effectively reduces urea-induced deactivation of the catalyst. In at least another embodiment, the urea-resistant coating includes at least one oxide from the group consisting of titanium oxide, tungsten oxide, zirconium oxide, molybdenum oxide, aluminum oxide, silicon dioxide, sulfur oxide, niobium oxide, molybdenum oxide, yttrium oxide, nickel oxide, cobalt oxide, and combinations thereof.

17 Claims, 5 Drawing Sheets

U.S. PATENT DOCUMENTS

| | | |
|---|---|---|
| 7,547,656 B2 | 6/2009 | Miura |
| 7,576,031 B2 | 8/2009 | Beutel et al. |
| 7,585,477 B2 | 9/2009 | Nakatsuji et al. |
| 7,601,662 B2 | 10/2009 | Bull et al. |
| 7,622,096 B2 | 11/2009 | Deeba et al. |
| 7,638,460 B2 | 12/2009 | Nakamura et al. |
| 7,640,730 B2 | 1/2010 | Gandhi et al. |
| 7,642,388 B2 | 1/2010 | Yang et al. |
| 7,662,744 B2 | 2/2010 | Kureti et al. |
| 7,674,743 B2 | 3/2010 | Gandhi et al. |
| 7,709,414 B2 | 5/2010 | Fujdala et al. |
| 7,722,845 B2 | 5/2010 | Caudle et al. |
| 7,727,499 B2 | 6/2010 | Liu et al. |
| 7,737,077 B2 | 6/2010 | Kitamura et al. |
| 7,744,980 B2 | 6/2010 | Boorom et al. |
| 7,749,472 B2 | 7/2010 | Chen et al. |
| 7,759,283 B2 | 7/2010 | Yamato et al. |
| 7,767,176 B2 | 8/2010 | Patchett et al. |
| 7,767,622 B2 | 8/2010 | Quell |
| 7,785,551 B2 | 8/2010 | Golden et al. |
| 7,811,961 B2 | 10/2010 | Jen et al. |
| 7,818,960 B2 | 10/2010 | Gonze et al. |
| 7,861,516 B2 | 1/2011 | Allansson et al. |
| 7,902,107 B2 | 3/2011 | Patchett et al. |
| 7,906,449 B2 | 3/2011 | Ando et al. |
| 7,919,051 B2 | 4/2011 | Li et al. |
| 7,943,097 B2 | 5/2011 | Golden et al. |
| 7,943,548 B2 | 5/2011 | Castellano et al. |
| 2002/0004446 A1 | 1/2002 | Fischer et al. |
| 2002/0054844 A1 | 5/2002 | Pfeifer et al. |
| 2002/0086795 A1 | 7/2002 | LaBarge et al. |
| 2002/0132725 A1 | 9/2002 | LaBarge et al. |
| 2002/0132727 A1 | 9/2002 | LaBarge et al. |
| 2002/0132733 A1 | 9/2002 | LaBarge et al. |
| 2003/0181328 A1 | 9/2003 | Hwang et al. |
| 2004/0220046 A1 | 11/2004 | Stockwell et al. |
| 2006/0105227 A1 | 5/2006 | Kim et al. |
| 2006/0213197 A1 | 9/2006 | Caro et al. |
| 2007/0051096 A1 | 3/2007 | Pfeifer et al. |
| 2007/0173404 A1 | 7/2007 | Kureti et al. |
| 2007/0224093 A1 | 9/2007 | Miyairi et al. |
| 2009/0155135 A1 | 6/2009 | Li |
| 2009/0320457 A1 | 12/2009 | Wan |
| 2010/0028220 A1 | 2/2010 | Mupparapu |
| 2010/0101221 A1 | 4/2010 | Charbonnel et al. |
| 2010/0303677 A1 | 12/2010 | Henry et al. |
| 2010/0322833 A1 * | 12/2010 | Cheng et al. ............ 423/213.5 |
| 2011/0020204 A1 | 1/2011 | Bull et al. |

* cited by examiner

UREA-RESISTANT CATALYTIC UNITS AND METHODS OF USING THE SAME

CROSS-REFERENCE TO RELATED APPLICATIONS

This application is a division of U.S. application Ser. No. 12/489,703 filed Jun. 23, 2009 and issued on Jun. 26, 2012 as U.S. Pat. No. 8,207,084. The disclosure of which is incorporated in its entirety by reference herein.

BACKGROUND

1. Field

Embodiments of the present invention relate to a urea-resistant catalytic unit for reducing catalyst deactivation due to urea poisoning.

2. Background Art

While offering certain benefits in fuel economy, internal combustion engines such as diesel engines often require special exhaust after treatment system to reduce waste species such as nitrogen oxide ($NO_x$) under oxidizing operating conditions.

Urea has been used as a reductant in the exhaust after treatment system for reducing $NO_x$ emissions in order to meet certain government and industry imposed emission regulations. For instance, aqueous urea has been injected into the exhaust stream within a selective catalytic reduction (SCR) after treatment system and hydrolyzed to form ammonia ($NH_3$) which then reduces $NO_x$ over a SCR catalyst.

In vehicle applications, and as a result of space restrictions, urea residence time is often short and the liquid urea may not have sufficient time to vaporize and hydrolyze before contacting the SCR catalyst. This situation is more prevalent at lower exhaust temperature, especially below 200 degree Celsius, where liquid urea may accumulate on the SCR catalyst and cause urea byproduct formation and subsequent deactivation of the SCR catalyst.

SUMMARY

According to at least one aspect of the present invention, a urea-resistant catalytic unit is provided for reducing catalyst deactivation due to urea poisoning. In at least one embodiment, the urea-resistant catalytic unit includes a catalyst having a catalytic surface, and a urea-resistant coating in contact with at least a portion of the surface, wherein the urea-resistant coating effectively reduces urea-induced deactivation of the catalyst.

In at least another embodiment, the catalyst is configured as at least one discrete particle, at least a portion of which being covered with the urea-resistant coating.

In at least yet another embodiment, the catalyst is configured as a sheet, at least a portion of which being covered with the urea-resistant coating.

In at least yet another embodiment, the catalyst includes a selective catalytic reduction catalyst.

In at least yet another embodiment, the urea-resistant catalytic unit further includes a substrate having a substrate surface to support the catalyst.

In at least yet another embodiment, the substrate has a porosity selected from the group consisting of a porosity of from 0.5 to 35 volume percent and a porosity of from 35 to 90 volume percent.

In at least yet another embodiment, the urea-resistant coating includes at least one oxide selected from the group consisting of titanium oxide, tungsten oxide, zirconium oxide, molybdenum oxide, aluminum oxide, silicon dioxide, sulfur oxide, niobium oxide, molybdenum oxide, yttrium oxide, nickel oxide, cobalt oxide, and combinations thereof.

In at least yet another embodiment, the urea-resistant coating is present in 0.1 to 30.0 percent by weight of the urea-resistant catalytic unit.

According to at least another aspect of the present invention, an emission control system is provided for reducing waste species from the exhaust of an internal combustion engine. In at least one embodiment, the emission control system includes an exhaust passage for transporting the exhaust from the engine, a reductant disposed within the exhaust passage and downstream of the engine, and a urea-resistant catalytic unit disposed downstream of the reductant. The urea-resistant catalytic unit is defined herein according to embodiments of the present invention.

According to yet another embodiment, a method is provided for reducing waste species from the exhaust of an internal combustion engine. In at least one embodiment, the method includes contacting the exhaust with a urea-resistant catalytic unit. The urea-resistant catalytic unit is defined herein according to embodiments of the present invention.

In at least another embodiment, the contact step is conducted in a lean operating condition.

In at least yet another embodiment, the method further includes subjecting the exhaust to an oxidation catalyst prior to the contacting step.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

As a matter of definition, and when used in this detailed description and in the claims:

"SCR" means selective catalytic reduction and includes a reducing catalyst which speeds or enhances a chemical reduction of $NO_x$ through the assistance of a reductant during lean operation.

"$NO_x$" means nitrogen oxide and illustratively includes a mixture of compounds of nitric oxide (NO) and nitrogen dioxide ($NO_2$).

"Urea poisoning" means catalyst deactivation due to accumulation of urea molecules on the catalyst and may be manifested by the formation of undesirable urea derived byproducts.

"Catalyst deactivation" means catalytic activity reduction due to urea poisoning. In the event the catalyst is a SCR catalyst, the catalyst deactivation means reduction in $NO_x$ conversion as catalyzed by the SCR catalyst due to urea poisoning.

It has been found, according to embodiments of the present invention, that catalyst deactivation due to urea poisoning may be effectively reduced or eliminated when the catalyst is protected with a urea-resistant coating. As will be described in more details below, at least one embodiment relates to a urea-resistant catalytic unit which includes a catalyst having a catalyst surface, and a urea-resistant coating in contact with at least a portion of the catalyst surface, wherein the urea-resistant coating effectively reduces urea-induced deactivation of the catalyst.

It has further been found, according to embodiments of the present invention, that the urea-resistant catalytic unit, according to at least one embodiment, effectively diminishes urea-induced catalyst deactivation, and particularly urea-induced reduction of $NO_x$ conversion. The urea-resistant catalytic unit according to embodiments of the present invention is able to diminish urea induced catalyst deactivation in the form of $NO_x$ conversion reduction by up to 75 percent, 85 percent, or 95 percent wherein a value of 100 percent decrease in SCR deactivation is theoretically achieved wherein urea poisoning is rendered completely absent.

While not intended to be limited by any theory, one possible mechanism by which the urea-resistant catalytic unit is resistant to urea poisoning may be that the catalyst and in particular the SCR catalyst for $NO_x$ conversion is protected through urea hydrolysis function of the urea-resistant coating. In addition, the urea-resistant coating is advantageously chosen and designed to have little or no impairment on the catalytic function of the SCR catalytic unit in converting $NO_x$.

Figure 1:
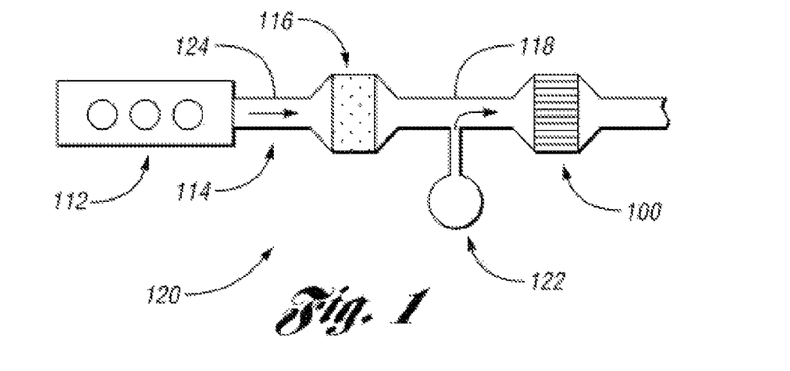
FIG. 1 depicts an emission control system for reducing waste materials from the exhaust of an internal combustion engine according to at least one aspect of the present invention.

According to at least one aspect of the present invention, an emission control system is provided for reducing waste species from the exhaust of an internal combustion engine. The waste species from the exhaust of an internal combustion engine may include unburned hydrocarbon (HC), carbon monoxide (CO), particulate matters (PM), nitric oxide (NO), and nitrogen dioxide ($NO_2$), with NO and $NO_2$, collectively referred to as nitrogen oxide or $NO_x$. In at least one embodiment, and as depicted in FIG. 1, an emission control system, generally shown at 120, includes an exhaust passage 114 for transporting the exhaust 124 from the engine 112, a reductant 118 disposed within the exhaust passage 114 downstream of the engine 112, and a urea-resistant catalytic unit 100 according to various embodiments described hereinafter, wherein the urea-resisting catalytic unit 100 has a catalyst and a urea-resistant coating which effectively reduces urea-induced deactivation of the catalyst. The reductant 118 is optionally supplied from a container 122. In at least another embodiment, an oxidation catalyst 116 is disposed in the passage 114 upstream of the urea-resistant catalytic unit 100.

As used herein and unless otherwise indicated, the reductant 118 may include ammonia, liquid urea, solid urea, or combinations thereof.

The urea-resistant catalytic unit 100 may include a substrate for support. The substrate is generally a flow-through monolith or any part thereof. A monolith is well known but is generally described as a ceramic block made of a number of substantially parallel flow channels. The monolith may be made of ceramic materials such as cordierite, mullite, and silicon carbide or metallic materials such as iron cromium alloy, stainless steel, and Inconel®. The flow channels of the monolith may be of any suitable size, and in certain embodiments are of a size of 0.5 to 10 millimeters in diameter. Because of the number of the channels, the contact area between an exhaust and a catalyst is enlarged. Further, the channels can be substantially straight, hollow, and parallel to the flow of the exhaust, therefore flow obstruction to the exhaust is effectively minimized.

Figure 1A:
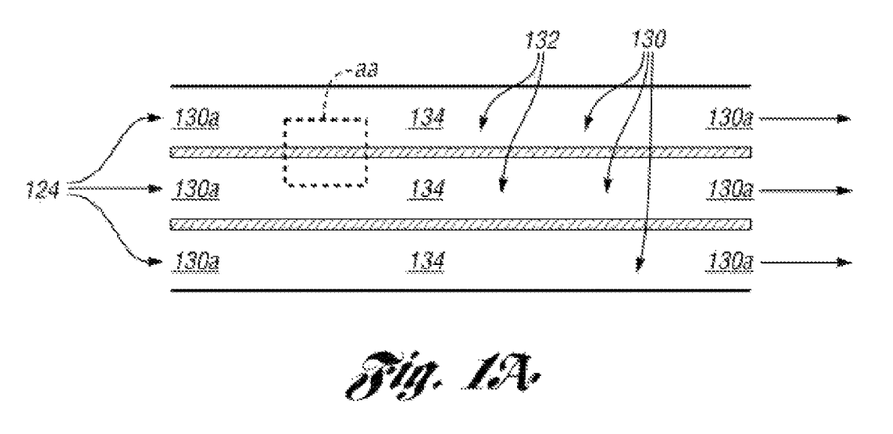
FIG. 1A schematically depicts a vertical cross-section of a urea-resistant catalytic unit according to at least one embodiment of the present invention.

In at least another embodiment, and as schematically depicted in FIG. 1A, the urea-resistant catalytic unit 100 includes a substrate configured as a plurality of flow-through channels 130 arranged substantially parallel from each other in the direction of the flow of the exhaust 124. A vertical cross-section of the catalytic unit 100, as depicted in FIG. 1A, illustratively shows open ends 130a of the flow-through channels 130 defined by the substrate walls 132 surrounding the flow-through channels 130. An exemplary area "aa" of the vertical section of the substrate wall 132 will be described in more detail hereinafter, and particularly with relation to FIGS. 2 and 3. In this embodiment, a substantially amount of the exhaust 124 may pass through the cavity 134 of the channels 130 and very little amount of the exhaust 124 passes through the walls 132. This design of the substrate and the walls thereof is useful where the urea-resistant catalytic unit 100 functions as a flow-through $NO_x$ occluding catalyst such as a SCR catalyst.

Figure 1B:
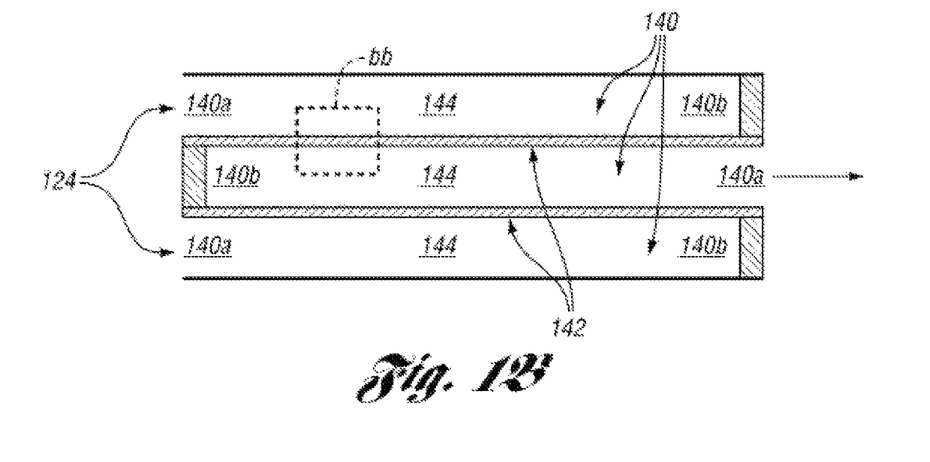
FIG. 1B schematically depicts a vertical cross section of a urea-resistant catalytic unit according to at least another embodiment of the present invention.

In at least yet another embodiment, and as schematically depicted in FIG. 1B, the urea-resistant catalytic unit 100 is based on a substrate configured as non-flow-through channels 140 arranged substantially parallel from each other in the direction of the flow of the exhaust 124. A vertical cross-section of the catalytic unit 100 illustratively shows open ends 140a and close ends 140b of the channels 140 defined by the substrate walls 142 surrounding the channels 140. An exemplary area "bb" of the vertical section of the substrate wall 142 will be described in more detail hereinafter, and particularly with relation to FIGS. 4 and 5A-5B. In this embodiment, the exhaust 124 may pass through both the cavities 144 and the walls 142 of the channels 140. This design of the substrate and the walls thereof is useful where the urea-resistant catalytic unit 100 functions as a non-flow-through particulate matter filter optionally associated with a $NO_x$ occluding catalyst such as a SCR catalyst.

Figure 2:
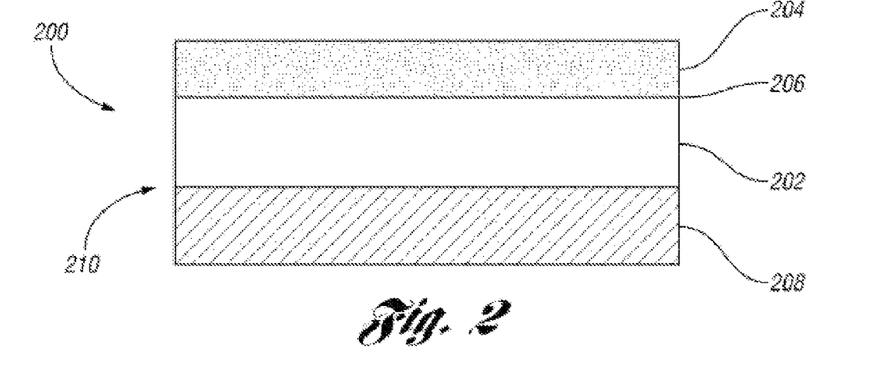
FIG. 2 depicts a urea-resistant SCR unit 200 further including a substrate 208, wherein the catalyst is configured as a sheet intermediate between the substrate surface and the urea-resistant coating.

According to at least one aspect of the present invention, a urea-resistant catalytic unit is provided for reducing catalyst deactivation due to urea poisoning. In at least one embodiment, a urea-resistant catalytic unit, generally shown at 200 in FIG. 2, includes a catalyst 202 having a catalyst surface 206 and a urea-resistant coating 204 in contact with at least a portion of the catalyst surface 206. In certain particular instances, and as shown in FIG. 2, the catalyst 202 is configured as a sheet covered with the urea-resistant coating 204 in the form of a layer. It is possible that in certain other instances, the urea-resistant coating 204 may contact the catalyst surface 206 in a discontinuous manner, the catalyst 202 may be configured non-uniform nor flat, or the urea-resistant coating 204 may be configured non-uniform nor flat, so long as at least 50 percent (%), 60%, 70%, 80%, 90% of the catalyst surface 206 of the catalyst 202 is in contact with the urea-resistant coating 204.

As a variation to the urea-resistant catalytic unit 200, and in correlation to the area "aa" of FIG. 1B in an enlarged view, the urea-resistant catalytic unit 200 is depicted in FIG. 2 to further include a substrate 208 having a substrate surface 210, wherein the catalyst 202 is configured as a sheet intermediate between the urea-resistant coating 204 and the substrate surface 210 of the substrate 208. Likewise, the catalyst 202 may be supported on the substrate 208 through the substrate surface 210 in a discontinuous fashion. The substrate 208 of FIG. 2 may be viewed as an equivalent to the portion of the substrate wall 132 depicted in the area "aa" of FIG. 1A. Further, the catalyst 202 may be configured non-uniform nor flat so long as at least 50 percent (%), 60%, 70%, 80%, 90% of the substrate surface 210 is in contact with the catalyst 202. Similarly, the substrate surface 210 may also be configured non-uniform nor flat so long as at least 50 percent (%), 60%, 70%, 80%, 90% of the catalyst surface 206 is in contact with the urea-resistant coating 204.

Figure 3A:
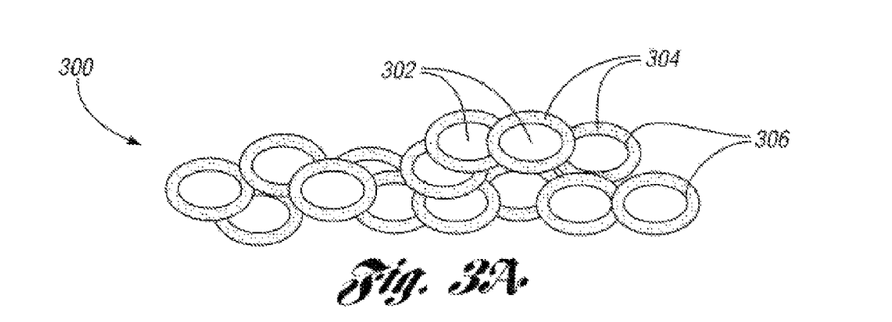
FIG. 3A depicts a urea-resistant catalytic unit according to at least another embodiment of the present invention, wherein the SCR unit includes a catalyst configured as at least one discrete particle covered with the urea-resistant coating.

In at least another embodiment, a urea-resistant catalytic unit is generally shown at 300 in FIG. 3A. The urea-resistant catalytic unit 300 includes a catalyst 302 having a catalyst surface 306, at least a portion of which being in contact with a urea-resistant coating 304. In certain particular instances, and as depicted in FIG. 3A, the catalyst is configured as at least one discrete particle having the catalyst surface 306 covered with the urea-resistant coating 304. It is possible that in certain other instances, the urea resistant coating 304 may cover the particle-shaped catalyst 302 in a discontinuous fashion, such that the urea-resistant coating 304 may be configured non-uniform nor smooth, as long as at least 50 percent (%), 60%, 70%, 80%, 90% of the catalyst surface 306 of the catalyst 202 is in contact with the urea-resistant coating 304.

Figure 3B:
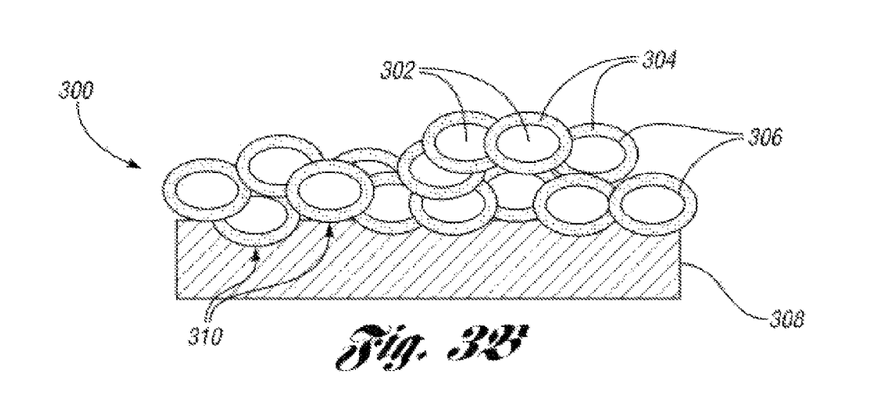
FIG. 3B depicts a urea-resistant SCR unit further including a substrate having a substrate surface in relation to FIG. 3A, wherein the catalyst is configured as the discrete particles covered with the urea-resistant coating and supported on the substrate surface of the substrate.

As a variation to the urea-resistant catalytic unit in accordance with FIG. 3A, and in correlation to the area "aa" of FIG. 1B in an enlarged view, the urea-resistant catalytic unit 300 is depicted in FIG. 3B to further include a substrate 308 having a substrate surface 310, wherein the catalyst 302 is configured as the at least one discrete particle in contact with the substrate surface 310 of the catalyst 302. The substrate 308 of FIG. 3B may be viewed as an equivalent to the portion of the substrate wall 132 depicted in the area "aa" of FIG. 1A. It is possible that the catalyst 302 configured as the discrete particle(s) may be supported on the substrate surface 310 in a discontinuous fashion, so long as at least 50 percent (%), 60%, 70%, 80%, or 90% of the substrate surface 310 is being contacted by the catalyst 302.

Figure 4:
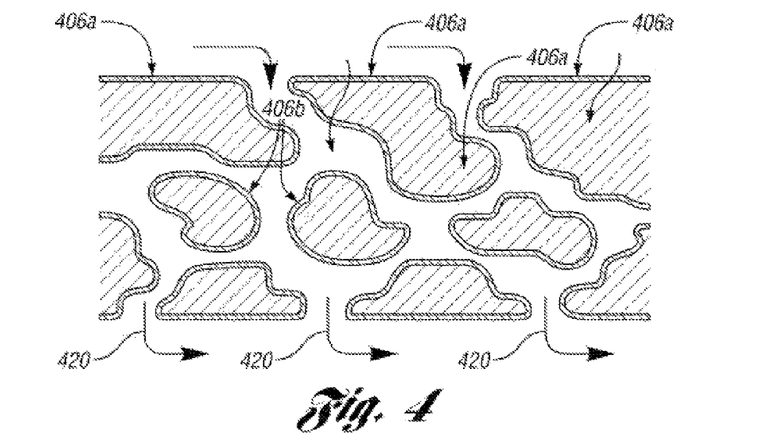
FIG. 4 depicts the area "bb" of FIG. 1B in an enlarged view.

FIG. 4 depicts, in an enlarged view, the area "bb" of the substrate wall of FIG. 1B. Due to the presence of internal pores collectively shown as unshaded area such as various paths 420, the substrate thus is defined by an external surface 406a and an internal surface 406b. In this embodiment, the exhaust passes through both the pores 420 located within the walls of the channels. At least a portion of the internal surface 406b is covered with a catalyst defined herein according to embodiments of the present invention.

Figure 5A:
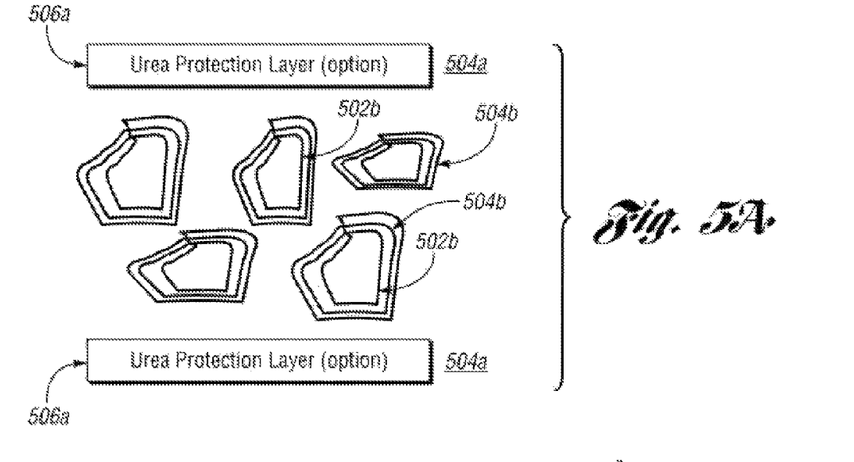
FIG. 5A depicts an alternative view of the enlarged cross-section of a catalytic unit in relation to FIG. 4, wherein the urea-resistant catalytic unit is shown to have an internal substrate surface in contact with a catalyst configured as a sheet intermediate between a urea-resistant coating and the internal substrate surface.

FIG. 5A depicts an enlarged vertical section of an exemplary substrate wall showing an internal substrate surface at least partially covered with a catalyst 502b which is configured as a contoured sheet intermediate between the internal substrate surface 506b and a urea-resistant coating 504b. An external substrate surface 506a is optionally in contact with a urea-resistant coating 504a.

Figure 5B:
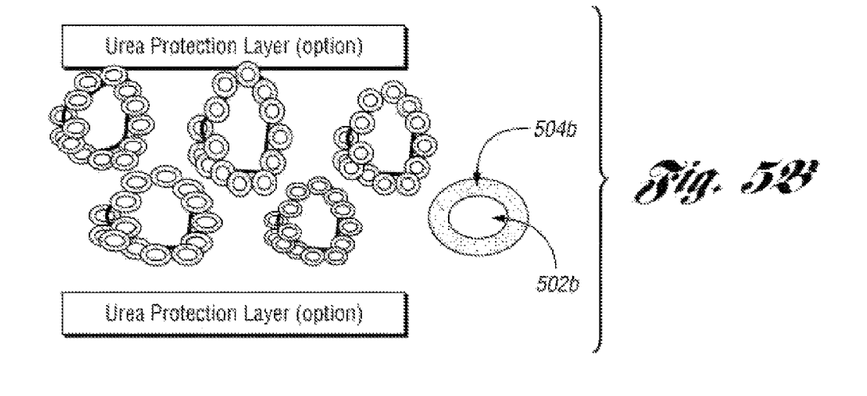
FIG. 5B depicts an alternative view of the enlarged cross-section of a catalytic unit in relation to FIG. 4, wherein the urea-resistant catalytic unit is shown to have an internal substrate surface in contact with a catalyst configured as at least one discrete particle covered with a urea-resistant coating.

FIG. 5B depicts an enlarged vertical section of an exemplary substrate wall showing an internal substrate surface at least partially covered with a catalyst 502b which is configured as at least one discrete particle supported on the internal substrate surface 506b and covered with the urea-resistant coating 504b. The external substrate surface 506a is optionally in contact with a urea-resistant coating 504a.

In at least one embodiment, the catalyst 202, 302, 502 includes a zeolite based $NO_x$ occluding catalyst or a SCR catalyst. The term "zeolite" generally refers to a framework aluminosilicate containing atoms of oxygen aluminum and/or silicon. An example of a natural zeolite is mordenite or a chabazite. Synthetic zeolites illustratively include type A as synthetic forms of mordenite, type B as ZSM-5® zeolites, and type Y as ultra-stabilized Beta zeolite. The framework structure of the zeolites often acquires an overall negative charge compensated for by exchangeable cations which may readily be replaced by other cations such as metal cations through methods including ion exchange. The $NO_x$ occluding catalyst typically includes an alkaline earth metal exchanged zeolite, precious metal exchanged zeolite such as platinum based and/or a base metal exchanged zeolite such as copper and iron based zeolites. While any type zeolite may be used, some suitable zeolites include X type zeolite, Y type zeolite, and/or ZSM-5 type zeolite.

The alkaline earth metal illustratively include barium, strontium, and calcium. Suitable calcium sources for the alkaline earth metal include calcium succinate, calcium tartrate, calcium citrate, calcium acetate, calcium carbonate, calcium hydroxide, calcium oxylate, calcium oleate, calcium palmitate and calcium oxide. Suitable strontium sources for the alkaline earth metal include strontium citrate, strontium acetate, strontium carbonate, strontium hydroxide, strontium oxylate and strontium oxide. Suitable barium sources for the alkaline earth metal include barium butyrate, barium formate, barium citrate, barium acetate, barium oxylate, barium carbonate, barium hydroxide and barium oxide.

The rare earth metal may illustratively include lanthanum, cerium, and/or neodymium. Suitable neodymium sources for the rare earth metal include neodymium acetate, neodymium citrate, neodymium oxylate, neodymium salicylate, neodymium carbonate, neodymium hydroxide and neodymium oxide. Suitable cerium sources for the rare earth metal include cerium formate, cerium citrate, cerium acetate, cerium salicylate, cerium carbonate, cerium hydroxide and cerium oxide. Suitable lanthanum sources for the rare earth metal include lanthanum acetate, lanthanum citrate, lanthanum salicylate, lanthanum carbonate, lanthanum hydroxide and lanthanum oxide.

The above described zeolite $NO_x$ occluding catalyst or the SCR catalyst contained within the catalyst 202, 302, 502 may be prepared by any suitable methods. In the event when the hydrogen-ion-exchanged acid zeolites are used, active ingredients may be incorporated into the zeolites in a manner illustratively shown as follows. A starting material is produced, including the zeolites, by mixing, milling and/or kneading the individual components or their precursor compounds (for example water-soluble salts for the specified metal oxides) and if appropriate with the addition of conventional ceramic fillers and auxiliaries and/or glass fibers. The starting material is then either processed further to form unsupported extrudates or is applied as a coating to a ceramic or metallic support in honeycomb or plate form. The starting material is then dried at a temperature of 20 to 100 degrees Celsius. After the drying operation, the starting material is calcined to form the active material by calcination at temperatures of between 400 and 700 degrees Celsius. In addition, after the calcining process, the calcined active material may be subjected to an optional aging treatment at a temperature that is higher than the calcining temperature. A temperature which is approximately 450 to 850 degrees Celsius may be selected for the optional aging. The optional aging treatment may be carried out for a period of 20 to 80 hours.

In certain instances, a binder may be used to bring together all ingredients to form the catalyst 202, 302, 502 and particularly when the catalyst is configured as discrete particles. The binder is used to prevent dissolution and redistribution of the ingredients. Possible binders include acidic aluminum oxide, alkaline aluminum oxide, and ammonium aluminum oxide. In certain particular instances, a soluble alkaline aluminum oxide with a pH of at least 8 is used as the binder. In the event that a binder is used, the binder may be included in an amount of from 1 to 10 weight percent, and particularly 2 to 6 weight percent of the total weight of the catalyst 202, 302, 502.

In at least one embodiment, the urea-resistant coating 204, 304, 504 contains at least one oxide illustratively including titanium dioxide, aluminum oxide, silicon dioxide, zirconium oxide, sulfur oxide ($SO_3$), tungsten oxide ($WO_3$), niobium oxide ($Nb_2O_5$), molybdenum oxide ($MoO_3$), yttrium oxide, nickel oxide, cobalt oxide, or combinations thereof. Without being limited by any theory, the oxide contained within the urea-resistant coating functions at least partially as hydrolyzation molecules that induce the hydrolyzation and hence breakdown of the excess urea and resultant alleviation of the deactivating effects of the excess urea.

In at least one embodiment, the catalyst 202, 302, 502 has a loading concentration in percent (%) by dry weight defined as an amount in grams of the catalyst relative to every 100 grams of the total dry weight of the urea-resistant catalytic unit. In at least one particular embodiment, the catalyst 202, 302, 502 has a loading concentration in a range independently selected from no less than 2.5% (percent), 5%, 7.5%, 10%, or 12.5%, to no greater than 32.5%, 27.5%, 22.5%, or 17.5%.

In at least one embodiment, the urea-resistant coating 204, 304, 504 has a loading concentration in percent (%) by dry weight defined as an amount in grams of the urea-resistant coating relative to every 100 grams of the total dry weight of the urea-resistant catalytic unit. In at least one particular embodiment, the urea-resistant coating has a loading concentration in a range independently selected from no less than 0.5% (percent), 1%, 5%, 7.5%, or 10%, to no greater than 30%, 25%, 20%, or 15%.

In at least one embodiment, the urea-resistant coating 204, 304, 504 has a loading concentration in a weight percent (%) defined as an amount in grams of the urea-resistant coating relative to every 100 grams of the total weight of the catalyst 202, 302, 502. In at least one particular embodiment, the loading concentration of the urea-resistant coating in relation to the loading concentration of the catalyst is in a ratio of 1:10 to 10:1, 1:7.5 to 7.5:1, 1:5 to 5:1, or 1:2.5 to 2.5:1.

The urea-resistant coating may be applied to the catalyst through any suitable methods. In at least one particular embodiment, a precursor substance of the urea-resistant coating is powdered, made into an aqueous slurry and then milled. The amount of the precursor substance may be determined by experiment or else be calculated based on the molecular weight and/or solubility of the particular precursor substance used. As a result, the amount of precursor substance present on the urea-resistant coating is such that a high effectiveness of the catalyst is achieved in the reduction of $NO_x$ in $NO_x$-containing exhaust gases. The catalyst such as a SCR catalyst, with or without the substrate, is dipped into the coating slurry. After any excess coating slurry is removed, the catalyst is subject to drying and calcination at a temperature of between 450 to 700 degrees Celsius for 2 to 5 hours.

The urea-resistant catalytic unit produced in this way has a considerable long-term hydrothermal stability under the influence of urea poisoning. For example, the SCR activity of the urea-resistant catalyst is not impaired by urea poisoning even after aging for 18 to 36 hours at 800 degrees Celsius or higher.

Suitable zirconium sources of the precursor substance for the urea-resistant coating 204, 304, 504 generally include zirconium dioxide, zirconium oxychloride, zirconium tert-butoxide, zirconium ethoxide, zirconium isopropoxide, and colloidal zirconium oxide.

Suitable titanium sources of the precursor substance for the urea-resistant coating 204, 304, 504 generally include titanium dioxide, titanium oxychloride, titanium oxynitrate, titanium isobutoxide, titanium n-butoxide, titanium tert-butoxide, titanium ethoxide, titanium isopropoxide, titanium methoxide, titanium n-propoxide, and colloidal titanium oxide.

Suitable aluminum sources of the precursor substance for the urea-resistant coating 204, 304, 504 generally include aluminum oxide, aluminum hydroxide, aluminum methoxide, aluminum n-butoxide, aluminum ethoxide, and aluminum isopropoxide.

Suitable silicon sources of the precursor substance for the urea-resistant coating 204, 304, 504 generally include silicon oxide and colloidal silicon oxide.

Suitable yttrium sources of the precursor substance for the urea-resistant coating 204, 304, 504 generally include yttrium oxide, colloidal yttrium oxide, and yttrium isopropoxide.

Suitable nickel sources of the precursor substance for the urea-resistant coating 204, 304, 504 generally include nickel oxide and nickel hydroxide.

Suitable cobalt sources of the precursor substance for the urea-resistant coating 204, 304, 504 generally include cobalt oxide and cobalt hydroxide.

According to at least another aspect of the present invention, a method is provided for removing $NO_x$ emissions from the exhaust of an internal combustion engine. In at least one embodiment, the method includes contacting the exhaust with a urea-resistant catalytic unit as described in various embodiments herein. In at least another embodiment, the method is applied in a lean operating condition. In at least yet another embodiment, the method further includes directing the exhaust through an oxidation catalyst prior to the contacting step.

EXAMPLES

Example 1

Employed in the instant example are SCR catalysts of fully formulated monolith Cu/zeolites. One such SCR catalyst used is SCR catalyst "A" having 300 cpsi and of 12 mil wall thickness wherein Cu/zeolite is coated on a high porosity cordierite honeycomb substrate. Another SCR catalyst used is SCR catalyst "B" having 300 cpsi and of 8 mil wall thickness wherein Cu/zeolite is coated on a low porosity cordierite honeycomb substrate.

The SCR catalysts "A" and "B" each having a core dimension of 1" diameter by 1" length are aged and examined for $NO_x$ conversion efficiency using a laboratory flow reactor system.

The aging process is conducted in three different ways: hydrothermal aging alone (hereinafter "hydrothermal"), hydrothermal aging coupled with pretreatment of wet urea soaking (hereinafter "wet urea+hydrothermal"), and hydrothermal aging coupled with pretreatment of wet urea soaking followed by drying (hereinafter "dry urea+hydrothermal"). Consistent with all the aging process in this and other examples contained herein, the term "hydrothermal aging" means that relevant catalyst is subject to dry heat at a temperature of 860 degrees Celsius for 30 minute.

In the aging process wherein pretreatment with urea is involved, a 32.2 weight percent aqueous urea solution is sprayed at room temperature as a mist onto the surfaces of the SCR catalysts. The amount of urea sprayed is the maximum liquid adsorption amount.

After the aging treatment, the aged SCR catalysts "A" and "B" are each subjected to a simulated exhaust having a composition tabulated in Table I below. Steady state $NO_x$ conversion is measured from 170° C. to 550° C. in 30-50 degree Celsius increments in the flow reactor connected to a FTIR instrument with a heated sample cell for wet gas analysis. The simulated exhaust flows through the SCR catalyst "A" or "B" at a space velocity of 30 Khr$^{-1}$.

TABLE I

| Composition of the Simulated Exhaust | | | | | |
|---|---|---|---|---|---|
| | $O_2$ | $H_2O$ | $CO_2$ | NO | $NH_3$ | $N_2$ |
| Concentration | 14% | 4.5% | 5% | 350 ppm | 350 ppm | Balance |

Figure 6:
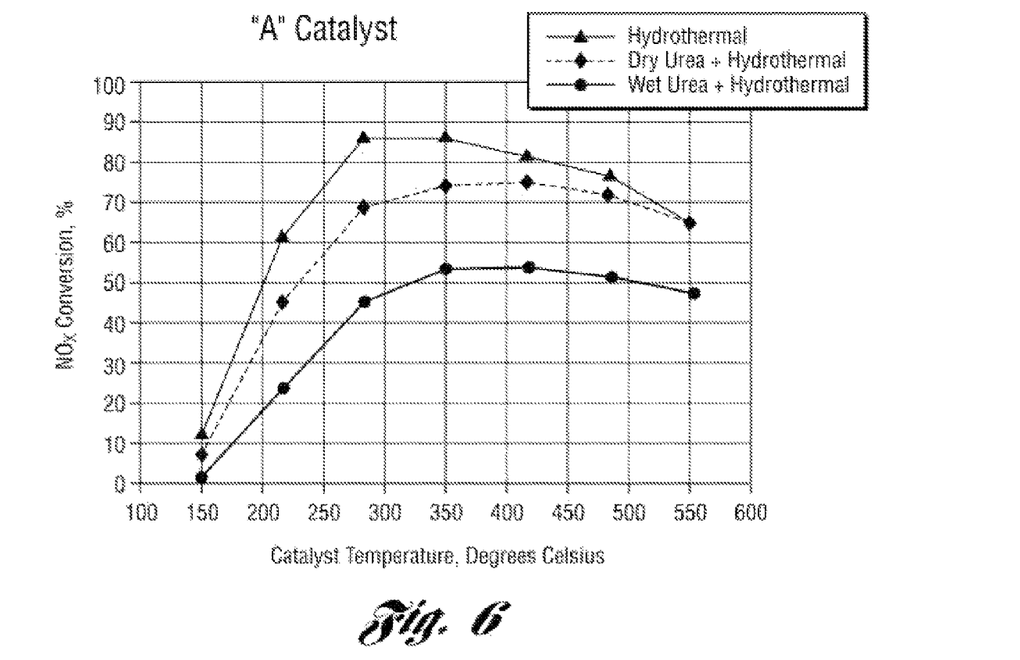
FIG. 6 depicts effects of differential aging processes on steady state $NO_x$ conversion rate exhibited by the SCR catalyst "Q" in relation to Example 1.

FIG. 6 depicts effects of differential aging processes on steady state $NO_x$ conversion rate exhibited by the SCR catalyst "A". Within the tested catalyst temperature range of 150 to 550 degree Celsius, the aging process of "wet urea+hydrothermal" is shown to reduce the $NO_x$ conversion compared to the hydrothermal aging alone. It is further shown that the aging process of "dry urea+hydrothermal" elicits a greater reduction of the $NO_x$ conversion up to a 47%. These results indicate that pretreatment with liquid urea such as urea mist soaking induces SCR catalyst deactivation in various degrees dependent on, for example, whether urea pretreatment is also followed by drying of the urea mist sprayed thereupon.

As a comparison, the SCR catalyst "A" is coated with $TiO_2$ prior to being subjected to the three different aging processes as described herein above in this example. The coating of $TiO_2$ is conducted as follows. $TiO_2$ power is mixed into an aqueous slurry and milled for 3 to 5 hours. Preformed monolithic SCR catalysts are dipped into the $TiO_2$ slurry. After the excess slurry is removed, the monolithic SCR catalysts are subjected to drying and calcination at a temperature of 500 to 600 degrees Celsius for 2 to 3 hours. The TiO2 is loaded at an amount of 0.5 to 5 grams per cubic inch of the monolithic SCR catalyst.

Figure 7:
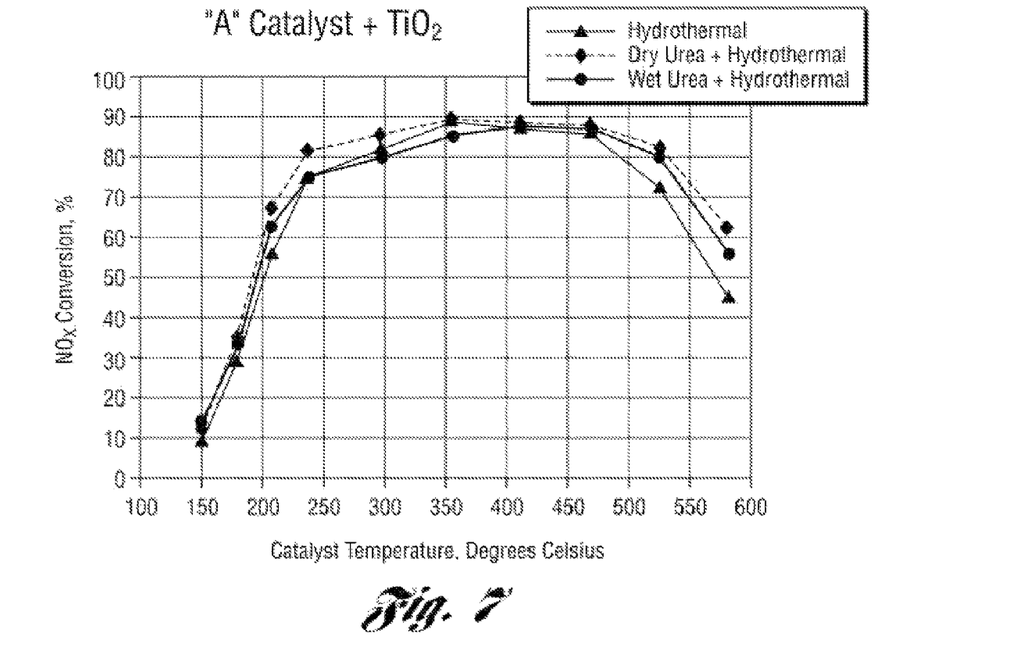
FIG. 7 demonstrates that the $TiO_2$ coating effectively reduces the detrimental effect of urea pretreatment on the $NO_x$ conversion efficiency in relation to Example 2.

As depicted in FIG. 7, the $TiO_2$ coating effectively reduces the detrimental effect of urea pretreatment on the $NO_x$ conversion efficiency. More particularly, a maximum reduction of $NO_x$ conversion between the aging process of hydrothermal alone and the aging process of "wet urea+hydrothermal" is minimized from a 14% as in the situation without $TiO_2$ coating to a 6.1% in the situation with $TiO_2$ coating. Likewise, the maximum reduction of $NO_x$ conversion between the aging process of "hydrothermal alone" and the aging process of "dry urea+hydrothermal" is accordingly minimized from a 47% to a mere 6.1%.

These results indicate that a $TiO_2$ coating pretreatment effectively improves the SCR catalyst performance and efficiently reduces urea poisoning otherwise exerted by the urea soaking.

Example 2

The SCR catalyst "B" is subjected to the different aging treatments as described in Example 1.

Figure 8:
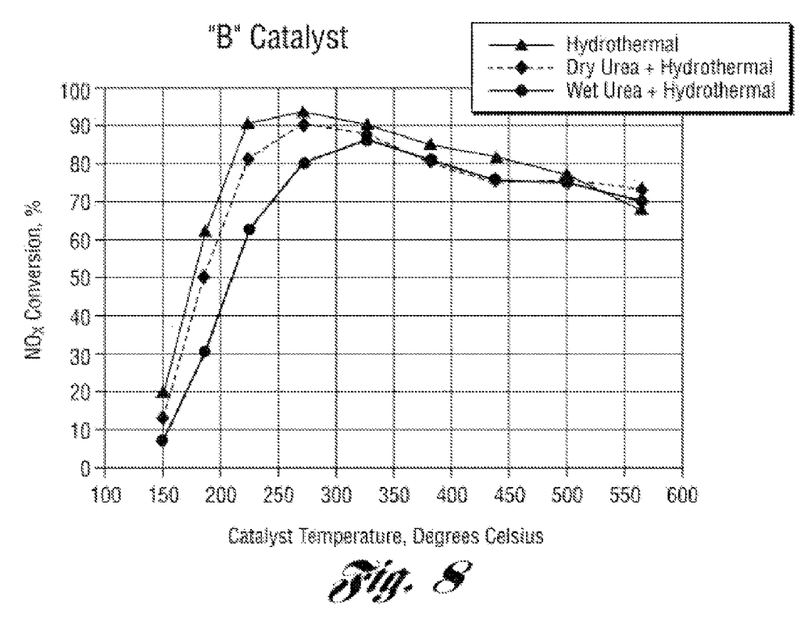
FIG. 8 demonstrates that the aging process of "wet urea+ hydrothermal" elicits an improved reduction of the $NO_x$ conversion rate compared to the aging process of "hydrothermal alone" in relation to Example 3.

As depicted in FIG. 8, the aging process of "dry urea+hydrothermal" elicits a maximum reduction 11% of the $NO_x$ conversion rate compared to the aging process of "hydrothermal alone."

The aging process of "wet urea+hydrothermal" effects a further reduction of the $NO_x$ conversion to a maximal amount of 30% compared to the aging process of "hydrothermal alone."

The SCR catalyst "B" is subjected to one of the three aging treatments of Example 1 following a pretreatment coating with $TiO_2$.

Figure 9:
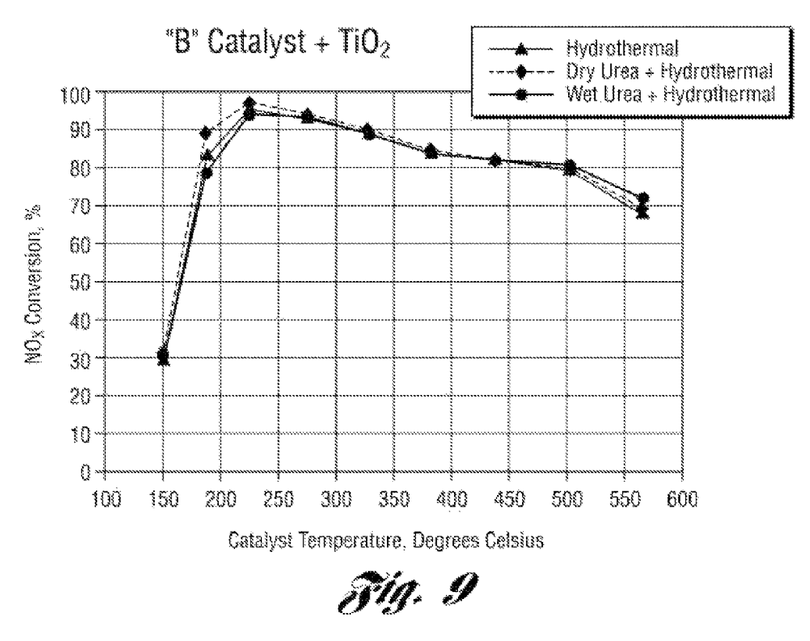
FIG. 9 demonstrates that the $TiO_2$ pretreatment effectively eliminates the reduction effects of urea on the $NO_x$ conversion in relation to Example 4.

As depicted in FIG. 9, the $TiO_2$ pretreatment effectively eliminates the reduction effects of urea on the $NO_x$ conversion. The rate of $NO_x$ conversion as a function of the catalyst temperature does not significantly differ among the three tested aging processes.

The $NO_x$ conversion reduction observed between the "wet urea+hydrothermal" aging and the "hydrothermal alone" aging is decreased to less than 7% as compared to the 11% in the above shown scenario wherein the catalyst is not $TiO_2$-pretreated.

Similarly, the $NO_x$ conversion reduction observed between the "dry urea+hydrothermal" aging and the "hydrothermal alone" aging is decreased to 11%, as compared to the 30% in the above shown scenario wherein the catalyst is not $TiO_2$-pretreated.

While the best mode for carrying out the invention has been described in detail, those familiar with the art to which this invention relates will recognize various alternative designs and embodiments for practicing the invention as defined by the following claims.

What is claimed is:

1. A method comprising:
forming a urea-resistant catalytic unit including a zeolite-based selection catalytic reduction catalyst, a substrate supporting the catalyst, and a urea-resistant coating contacting at least a portion of the catalyst, the catalyst being positioned between the substrate and the urea-resistant coating, the urea-resistant coating including at least one oxide of titanium, silicon, zirconium, sulfur, tungsten, niobium, molybdenum, yttrium, nickel, and cobalt.

2. The method of claim 1, further comprising contacting an engine exhaust with the urea-resistant catalytic unit.

3. The method of claim 2, further comprising providing urea to the engine exhaust.

4. The method of claim 2, further comprising contacting the engine exhaust with an oxidation catalyst.

5. The method of claim 4, wherein the engine exhaust contacts the oxidation catalyst prior to contacting the urea-resistant catalytic unit.

6. The method of claim 2, wherein the contact step is conducted in a lean operating condition.

7. The method of claim 1, further comprising submerging at least a portion of the catalyst into a urea-resistant coating material to form the urea-resistant coating.

8. The method of claim 7, wherein at least a portion of the catalyst is submerged into a solution of metal oxide as the urea-resistant coating material to form the urea-resistant coating.

9. The method of claim 7, wherein at least a portion of the catalyst is submerged into a solution of titanium oxide to form the urea-resistant coating.

10. The method of claim 7, wherein at least a portion of the catalyst as supported on the substrate is submerged into the urea-resistant coating material to form the urea-resistant coating which contacts at least a portion of the catalyst.

11. The method of claim 1, wherein the substrate is provided to have a porosity selected from the group consisting of a porosity of from 0.5 to 35 volume percent and 35 to 90 volume percent.

12. The method of claim 1, wherein the urea-resistant coating is provided in 5 to 30% percent by dry weight of the urea-resistant catalytic unit.

13. The method of claim 1, wherein the urea-resistant coating is provided in a weight ratio of 1:10 to 10:1 relative to the catalyst.

14. The method of claim 1, wherein the catalyst is provided as a number of discrete particles supported on the substrate.

15. The method of claim 1, wherein the catalyst is provided as a layer of catalyst material supported on the substrate.

16. A method comprising:
contacting an engine exhaust with a urea-resistant catalytic unit, the urea-resistant catalytic unit including a zeolite-based selection catalytic reduction catalyst, a substrate supporting the catalyst, and a urea-resistant coating contacting at least a portion of the catalyst, the catalyst being positioned between the substrate and the urea-resistant coating, the urea-resistant coating including at least one oxide of titanium, silicon, zirconium, sulfur, tungsten, niobium, molybdenum, yttrium, nickel, and cobalt.

17. A method comprising:
contacting an engine exhaust with a urea-resistant catalytic unit, the urea-resistant catalytic unit including a zeolite-based selection catalytic reduction catalyst, a substrate supporting the catalyst, and a urea-resistant coating contacting at least a portion of the catalyst, the catalyst being positioned between the substrate and the urea-resistant coating, the urea-resistant coating including at least one oxide of titanium, silicon, zirconium, sulfur, tungsten, niobium, molybdenum, yttrium, nickel, and cobalt;
providing urea to the engine exhaust; and
contacting the engine exhaust with an oxidation catalyst.

* * * * *